(12) United States Patent
Rao et al.

(10) Patent No.: US 7,788,378 B2
(45) Date of Patent: Aug. 31, 2010

(54) APPARATUS AND METHOD FOR COMMUNITY RELAY NODE DISCOVERY

(75) Inventors: Ravi T. Rao, Redmond, WA (US); Tomer Weisberg, Bellevue, WA (US); Noah Horton, Sammamish, WA (US); Christian Huitema, Clyde Hill, WA (US); Sandeep K. Singhal, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1341 days.

(21) Appl. No.: 10/907,985

(22) Filed: Apr. 22, 2005

(65) Prior Publication Data

US 2006/0242227 A1    Oct. 26, 2006

(51) Int. Cl.
*G06F 15/173* (2006.01)
(52) U.S. Cl. .......................... 709/226; 709/223
(58) Field of Classification Search .............. 709/223, 709/226, 227, 228; 726/11, 12
See application file for complete search history.

(56) References Cited

U.S. PATENT DOCUMENTS

| | | | | |
|---|---|---|---|---|
| 2002/0143855 A1* | 10/2002 | Traversat et al. | ............ | 709/202 |
| 2002/0143989 A1 | 10/2002 | Huitema et al. | ............ | 709/243 |
| 2004/0111515 A1 | 6/2004 | Manion et al. | ............ | 709/227 |
| 2004/0190549 A1 | 9/2004 | Huitema | ............ | 370/466 |
| 2005/0004916 A1 | 1/2005 | Miller et al. | ............ | 707/10 |
| 2005/0091529 A1 | 4/2005 | Manion et al. | ............ | 713/201 |
| 2005/0108371 A1 | 5/2005 | Manion et al. | ............ | 709/223 |
| 2005/0177715 A1 | 8/2005 | Somin et al. | ............ | 713/156 |
| 2006/0053485 A1* | 3/2006 | Li | ............ | 726/11 |
| 2006/0184693 A1 | 8/2006 | Rao et al. | | |

OTHER PUBLICATIONS

International Search Report for PCT/US05/27580 mailed Nov. 27, 2006.
Written Opinion for PCT/US05/27580 mailed Nov. 27, 2006.
Mockapetris, P., "Domain Names—Implementation and Specification," Nov. 1987, http://www.ietf.org/rfc/rfc1035.txt, 52 pages.
Costello, A., "Punycode: A Bootstring encoding of Unicode for Internationalized Domain Names in Applications (IDNA)," The Internet Society, 2003, http://www.fazs.org/rfcs/rfc3492.html, 27 pages.
"Teredo Overview," Microsoft Corporation, website, 30 pages available at http://www.microsoft.com/technet/prodtechnol/winxppro/maintain/teredo.mspx, © 2003 Microsoft Corporation.

* cited by examiner

*Primary Examiner*—Yemane Mesfin
(74) *Attorney, Agent, or Firm*—Marshall, Gerstein & Borun LLP (57) ABSTRACT

A method of discovering a community relay node within a network community wherein the community relay node is operatively coupled to an access-protected client and adapted to facilitate communication between the access-protected client and a requesting client, includes receiving a request message from a requesting client relating to a request for a community relay node, associating the request message with a serverless name resolution protocol name, selecting a community relay node from among a list of community relay nodes based on the serverless name resolution protocol name, wherein the list of community relay nodes comprises at least one internet protocol address associated with a community relay node, and returning an internet protocol address of the selected community relay node to the requesting client.

20 Claims, 7 Drawing Sheets

APPARATUS AND METHOD FOR COMMUNITY RELAY NODE DISCOVERY

BACKGROUND

Network communication technologies on the allow users with common interests to collaborate, share files, chat with one another, multi-cast audio and video for presentations and group meetings, and engage in multi-player gaming. Most network communication and formation takes place in a server-centric environment or a peer-to-peer environment. In a server-centric environment all communication flows to or through large central servers to which individuals may connect to join and participate in the group. Peer-to-peer technologies enable users to contact one another in a serverless environment. However, in many cases a client is access-protected behind a firewall (e.g., personal, network or enterprise) which causes problems when initiating incoming connections. Although firewalls may be more easily traversed if only one client is access-protected, firewall traversal between two access-protected clients is difficult even under an administrator's control. However, this problem may be solved by using community relay nodes, also referred to as supernodes.

A community relay node may be a computer or server that is not access-protected and may easily accept incoming communications from a transmitting client, and route the communication to the receiving client. The community relay node may thereby relay communications between two access-protected clients. The community relay node may be any computer or server with sufficient resources (e.g., quality of service) to relay the communications between access-protected clients. A client that wants to communicate with another client may request a community relay node to assist with the communication. However, a requesting client does not always know which computers/servers are community relay nodes. Known community relay nodes may also become unavailable, which may not be known by the requesting client. As such, a requesting client may encounter problems discovering a community relay node. Further, the community relay node required by a requesting client may depend on the communication protocol type being requested (e.g., secure sockets layer, user datagram protocol, etc.), thereby further causing difficulty in finding a suitable community relay node.

SUMMARY

A method of discovering a community relay node within a network community is disclosed wherein the community relay node is operatively coupled to an access-protected client and adapted to facilitate communication between the access-protected client and a requesting client. The method may include receiving a request message from a requesting client relating to a request for a community relay node, associating the request message with a serverless name resolution protocol name, selecting a community relay node from among a list of community relay nodes based on the serverless name resolution protocol name, wherein the list of community relay nodes comprises at least one internet protocol address associated with a community relay node, and returning an internet protocol address of the selected community relay node to the requesting client.

A computer readable medium having computer executable instructions for performing steps of a method of bootstrapping communication between a community relay node and a requesting client is disclosed. The computer readable medium may include computer executable instructions for receiving a domain name from a requesting client, for associating the domain name with a peer name, for resolving the peer name to one or more internet protocol addresses, where each internet protocol address relates to a community relay, for selecting a community relay node from the one or more resolved internet protocol addresses, and for returning the internet protocol address of the selected community relay node to the requesting client.

A computer system is disclosed. The computer system may include a processing apparatus, domain name system network interface operatively coupled to the processing apparatus, a peer name resolution protocol network interface operatively coupled to the domain name system network interface and to the processing apparatus. The domain name system network interface may be operatively coupled to a network, and the peer name resolution protocol network interface may be operatively coupled to a community relay. The computer system may further include a first and second cache operatively coupled to the peer name resolution protocol network interface. The first cache may be associated with a first peer name resolution protocol name and adapted to store internet protocol addresses of a first plurality of community relay nodes. The second cache may be associated with a second peer name resolution protocol name and adapted to store internet protocol addresses of a second plurality of community relay nodes. The processing apparatus may include a processor and a memory operatively coupled to the processor. The processing apparatus may be programmed to receive a request message from a client relating to a request for a community relay node, to resolve the request message to the first peer name resolution protocol name or to the second peer name resolution protocol name, to select a community relay node from the first cache if the request message is resolved to the first peer name resolution protocol name, to select a community relay node from the second cache if the request message is resolved to the second peer name resolution protocol name, and to transmit the internet protocol address of the selected community relay node to the client.

DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
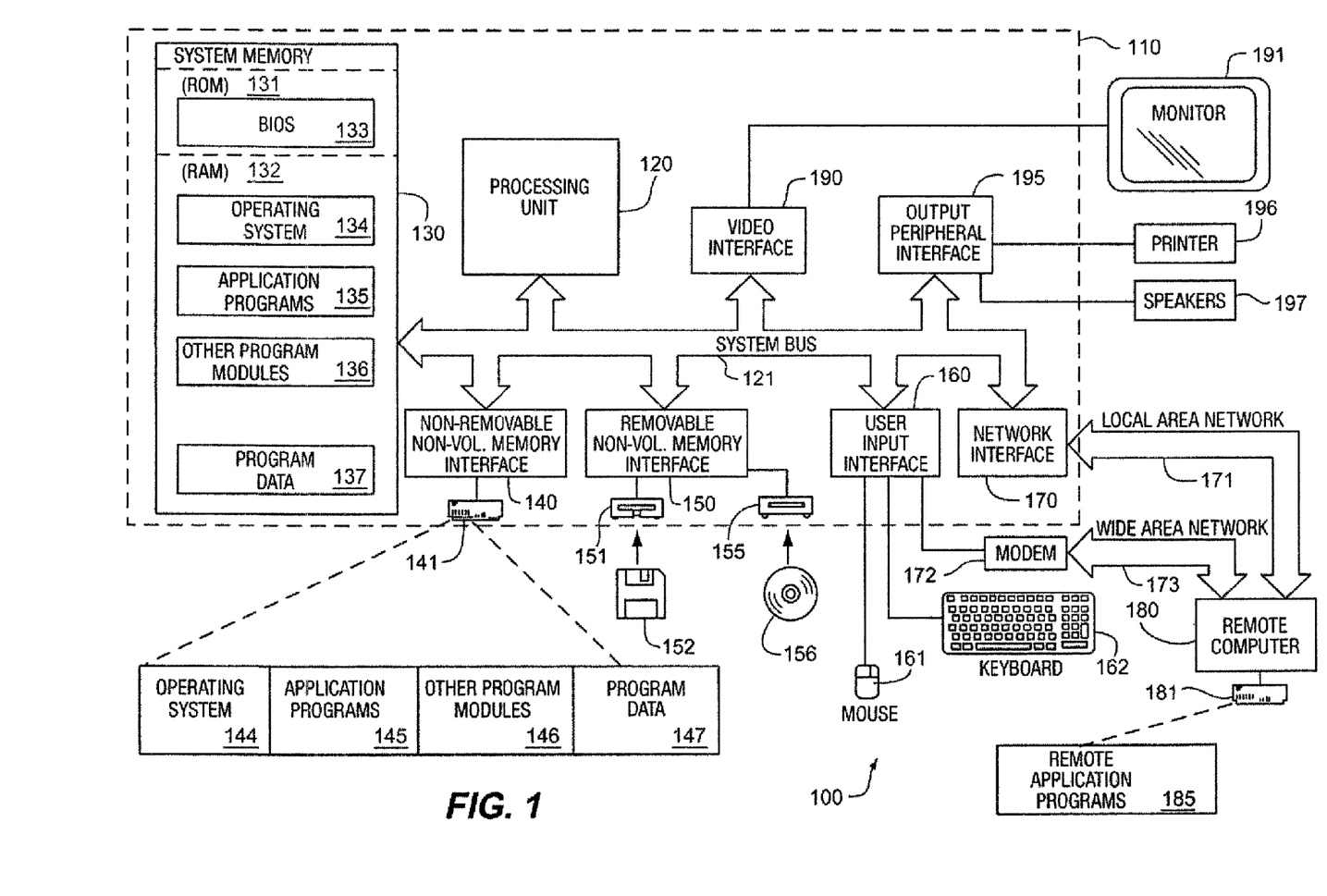
FIG. 1 is a block diagram of a computing system that may operate in accordance with the claims.

FIG. 1 illustrates an example of a suitable computing system environment 100 on which a system for the steps of the claimed method and apparatus may be implemented. The computing system environment 100 is only one example of a suitable computing environment and is not intended to suggest any limitation as to the scope of use or functionality of the method of apparatus of the claims. Neither should the computing environment 100 be interpreted as having any dependency or requirement relating to any one or combination of components illustrated in the exemplary operating environment 100.

The steps of the claimed method and apparatus are operational with numerous other general purpose or special purpose computing system environments or configurations. Examples of well known computing systems, environments, and/or configurations that may be suitable for use with the methods or apparatus of the claims include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The steps of the claimed method and apparatus may be described in the general context of computer-executable instructions, such as program modules, being executed by a computer. Generally, program modules include routines, programs, objects, components, data structures, etc. that perform particular tasks or implement particular abstract data types. The methods and apparatus may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the steps of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
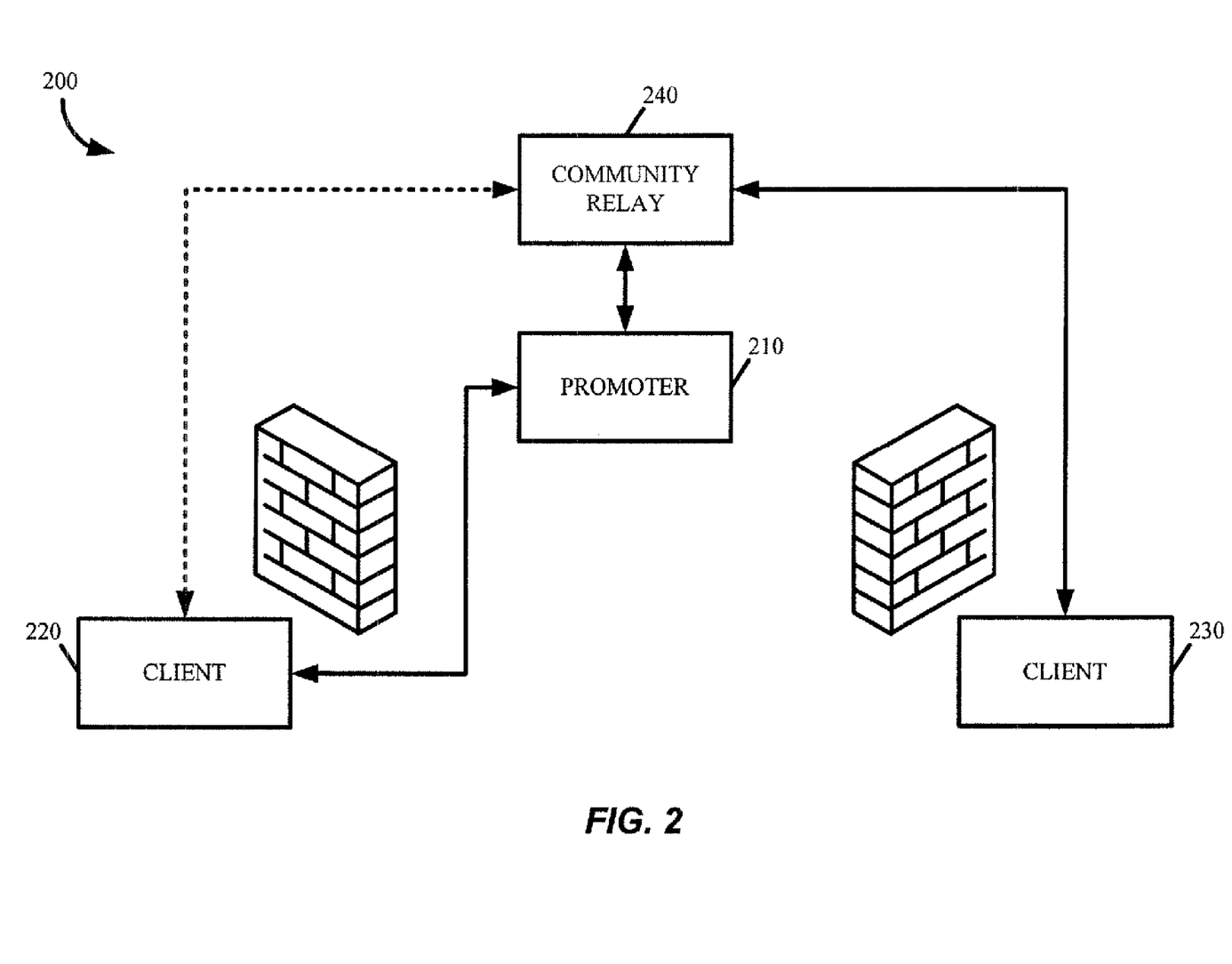
FIG. 2 is a block diagram of a network system in accordance with the claims.

FIG. 2 is an illustration of an example of a networking system 200. Referring to FIG. 2, the networking system 200 may include a promoter 210, a first client 220 operatively coupled to the promoter 210 and a community relay node 240, also referred to as a supernode, operatively coupled to the promoter 210. The networking system 200 may also include a second client 230 operatively coupled to the community relay node 240. Each client 220, 240 may be access-protected behind a security system, such as network firewall or personal firewall. The community relay node 240 may be used to facilitate and route communications between the first and second clients 220, 230. As explained further below, the first client 220 may eventually be operatively coupled to the community relay node 240 with the assistance of the promoter 210.

The first and second clients 220, 230, the community relay node 240 and the promoter 210 may be provided in different geographic locations, and operatively coupled to each other via a network. For example, the first client 220 may be operatively coupled to the promoter 210 via the Internet and may communicate with the promoter 210 via an internet communication protocol, such as IPv4 or IPv6. In a similar manner, the second client 230 may be operatively coupled to the community relay node 240 via the Internet and may communicate via an internet communication protocol. The promoter 210 may also be operatively coupled to the community relay 240 by a peer-to-peer network and may community via a serverless resolution protocol, such as a peer name resolution protocol (PNRP). Examples of peer name resolution protocol are disclosed in U.S. Patent Publication No. 2002/0143989 filed Aug. 29, 2001, and U.S. Patent Publication No. 2005/0004916 filed Jun. 13, 2003, the contents of which are expressly incorporated by reference herein.

The promoter 210 may be a server computer, or multiple server computers, and may be used as part of a domain name service for relaying and/or resolving domain name requests. As discussed further below, the promoter 210 may also be used for peer name resolution to query community relay nodes 240 and bootstrap communication between a client 220 and a community relay node 240. For example, the promoter 210 may continuously receive domain name service requests from various clients. The promoter 210 may resolve the domain name service request and return an internet protocol (IP) address in response to the request.

The community relay node 240 may be a personal computer, a server computer, or a group of computers that may opt-in or otherwise volunteer as a community relay node. In one example, the community relay node 240 may be a client or group of clients. Generally, the community relay node 240 offers reliable quality of service (QOS), such as sufficient speed, bandwidth, etc., and may offer a particular communication protocol, such as secure sockets layer (SSL) protocol or user datagram protocol (UDP). The community relay node 240 may be used to assist access-protected clients (e.g., firewalled clients) in communicating with other clients, which may also be access-protected. For example, the clients 220, 230 may each be access-protected by a firewall, which prevent incoming connections. The community node 240 is generally not access-protected by a firewall and may therefore receive incoming connections from a client. The community relay node 240 may be authenticated with respect to the clients 220, 230, such that the clients 220, 230 accept incoming connections from the community relay node 240 through the firewall. The authentication may be established by third party authentication or by direct authentication between the community relay node 240 and the client. A client 220 may request the community relay node 240 to assist in communicating with another client 230. Upon establishing a connection between the two clients 220, 230, the community relay node 240 may subsequently relay communications between the first and second clients 220, 230. Because the community relay node is not access-protected by a firewall, the community relay node 240 may easily accept incoming communications from a transmitting client, and because the community relay node 240 is authenticated, it may easily route the communication to the receiving client. It should be understood that while only one community relay node may be used to route communications between clients 220, 230, the communications may be routed among multiple community relay nodes. It should be further understood that a community relay node may relay several different communications among several different clients.

Although the networking system 200 is shown to include one promoter 210, one community relay node 240 and two clients 220, 230, it should be understood that different numbers of promoters, community relay nodes and clients may be utilized. For example, the clients 220, 230 may each be part of a larger network or group of clients. The networking system 200 may also include a plurality of community relay nodes 240 operatively coupled to the promoter 210, and each community relay node 240 may be operatively coupled to many different clients to facilitate and route communications between clients. Some community relay nodes may be used for particular communication protocols, such as SSL or UDP.

Figure 3:
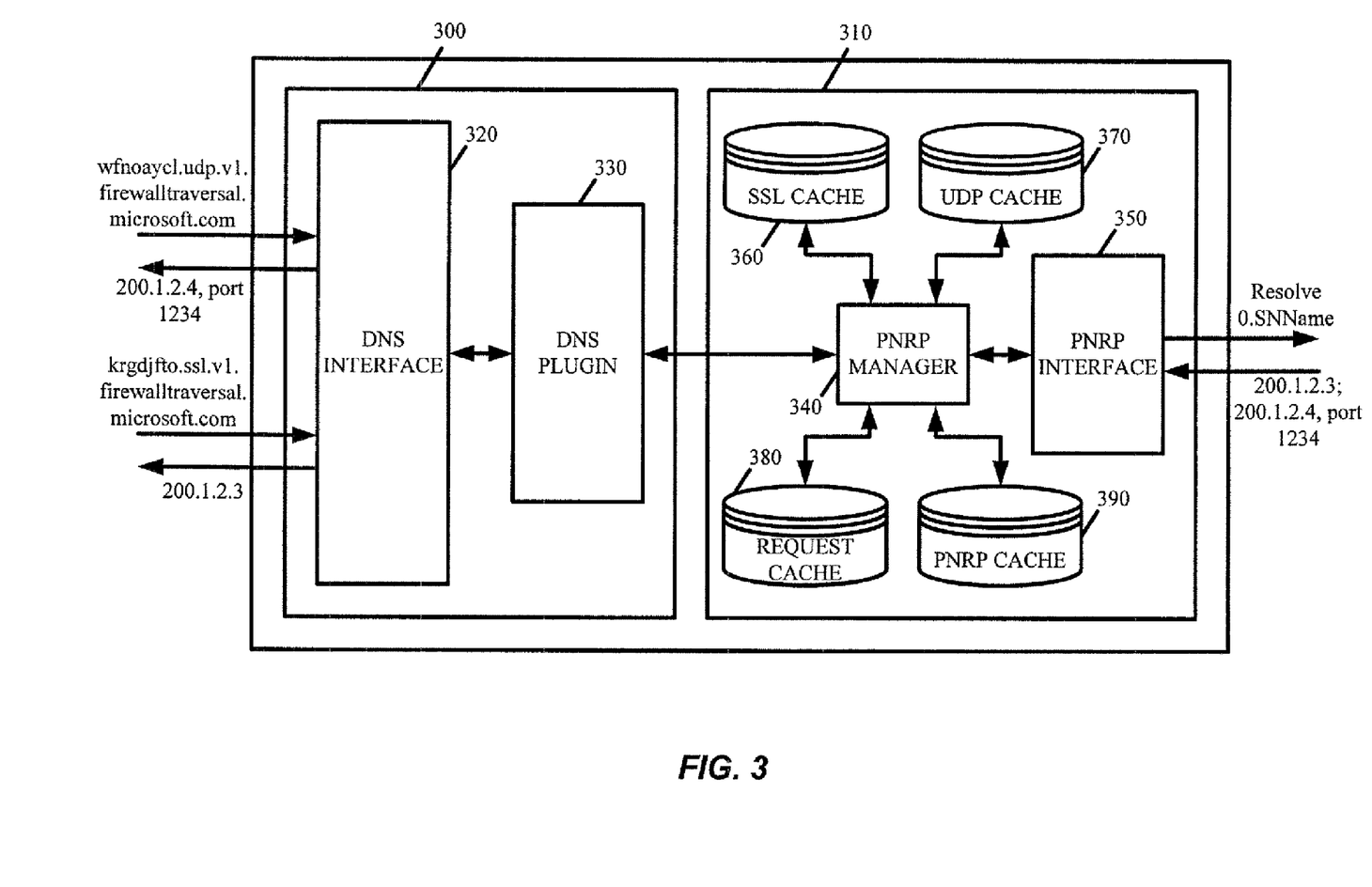
FIG. 3 is a block diagram of a computing system for bootstrapping communications between a client and a community relay node within the network system in accordance with the claims.

FIG. 3 is a block diagram of an example of the promoter 210. Generally, the promoter includes a domain name service (DNS) front end 300 for internet-based communications, such as hypertext transfer protocol (HTTP) communication channels, and a serverless resolution protocol (e.g., PNRP) back end 310 for peer-to-peer based communications. In one example, the DNS front end 300 of the promoter 210 may function as part of the standard DNS service to resolve domain name resolution requests other than requests for a community relay node. The DNS front end may communicate with clients via HTTP to receive domain name resolution requests for a community relay node from a client and to return an internet protocol (IP) address (and port number where necessary) of a community relay node to the requesting client. The PNRP back end 310 may conduct PNRP resolution queries of community relay nodes and store information about community relay nodes in response to the queries. The PNRP back end 310 may further resolve requests for a community relay node from the DNS front end, and return an IP address of a community relay node to the DNS front end 300. Although shown in a single block, the promoter 210 may include multiple interconnected computers, as indicated above.

As shown in FIG. 3, the DNS front end 300 includes a DNS network interface 320 and a DNS plug-in 330 operatively coupled to the DNS interface 320. The DNS interface 320 may be operatively coupled to the Internet and capable of HTTP communications with a client 220, including DNS name resolution requests for a community relay node. The DNS interface 320 may include a DNS decoder for parsing the domain name resolution request from the client 220 into a query name and a query type. The query name may relate to DNS name used to identify the promoter 210 and the query type may relate to the communication protocol type requested by the client 220 (e.g., SSL, UDP). The DNS interface 320 may further include a DNS encoder for replying to the client 220 with the IP address of a community relay node in response to the request. The DNS interface may further resolve DNS name resolution requests by matching the DNS name of the request for a community relay node to the relevant PNRP name via a preconfigured map. As an alternative, the decoder may be utilized to decode the DNS name to resolve a PNRP name encoded within the DNS name, as discussed further below.

The DNS plug-in 330 may be operatively coupled to the PNRP back end 310 to pass requests for a community relay node to the PNRP back end 310, and return an error for unsupported requests, such as requests other than requests for community relay nodes and requests for unsupported query types. The DNS plug-in 330 may return IP addresses of community relay nodes resolved by the PNRP back end to the DNS interface 320 to respond to the client's request for a community relay node. The DNS plug-in 330 may further be used to initialize and de-initialize the layers of the promoter 210. A sample computer code implementation for initializing the layers may be as follows:

```
DWORD WINAPI DnsPluginInitialize(
    PLUGIN_ALLOCATOR_FUNCTION pDnsAllocateFunction,
    PLUGIN_FREE_FUNCTION pDnsFreeFunction)
```

A sample computer code implementation for de-initializing the layers may be as follows:

DWORD WINAPI DnsPluginCleanup( )

The PNRP back end 310 may include a PNRP manager 340 and a PNRP network interface 350 operatively coupled to the PNRP manager 340. The PNRP manager 340 may be operatively coupled to the DNS plug-in 330 to receive the PNRP name related to the resolution request for a community relay node that was resolved by the DNS front end 300. The PNRP manager may manage PNRP resolution requests from the DNS front end 300, resolve and manager PNRP names of community relay nodes and return IP addresses of community relay nodes in response to requests for community relay nodes. A PNRP interface 350 may be operatively coupled to several community relay nodes and capable of peer-to-peer communications with the community relay nodes, including transmitting PNRP resolution queries to community relay nodes and receiving responses from community relay nodes. The PNRP interface 350 may be provided as a PNRP application program interface which conducts remote procedure calls (RPCs) to a PNRP service on the promoter 210 during PNRP resolution queries. However, in another example, the performance of the PNRP interface 350 may be improved using a PNRP data link layer (DLL) to remove the PNRP service from the promoter 210, thereby eliminating the RPC process.

Several caches 360, 370, 380, 390 may be operatively coupled to the PNRP manager 340. The caches may be provided as a single memory or database that is partitioned into different cache portions, or may be provided as different memories or databases, each operatively coupled to the PNRP manager. The caches may include resolution caches 360, 370, a request cache 380 and a PNRP cache 390.

The resolution caches 360, 370 may be provided to queue and store information on previously resolved community relay nodes that are available for a requesting client. Separate caches 360, 370 may be provided for different communication protocol types, such that a list of available SSL community relay nodes are maintained in one cache 360 and a list of available UDP community relay nodes are maintained in another cache 370. The resolution caches 360, 370 may each include information regarding the quality of service, load, location, IP address and PNRP name of each community relay node stored in the cache. In response to requests from the DNS plug-in, the PNRP manager 340 may select one or more community relay nodes from the appropriate resolutions cache 360, 370 and return the IP address of the community relay node to the DNS plug-in 330 for subsequent response to the requesting client. As discussed further below, the PNRP manager 340 may account for a variety of factors in selecting the community relay node, such as quality of service, proximity to the requesting client and load balancing.

The request cache 380 may be provided to queue the requests for community relay nodes as received from the DNS plug-in 330. The requests may be stored in the request cache 380 according to the communication protocol type being requested. The PNRP manager 340 may store requests received from the DNS plug-in 330 in the request cache 380 and respond to the requests in the order in which the requests are queued.

The PNRP cache 390 may be provided to maintain a list(s) of known community relay nodes, including the PNRP names of previously resolved community relay nodes. Each PNRP name may correspond to more than one community relay node. For example, all known SSL community relay nodes may correspond to a PNRP name, whereas all known UDP community relay nodes may correspond to another PNRP name. The PNRP cache 390 may maintain separate lists of known community relay nodes according to the communication protocol type. For example, known SSL community relay nodes may be provided in one list, and associated with the corresponding PNRP name, whereas known UDP community relay nodes may be provided as another list and associated with the corresponding PNRP name. The same PNRP names may also be used to correspond to the lists of available community relay nodes stored in the resolution caches 360, 370. The PNRP manager 340 may thereby use the PNRP names to identify the appropriate resolution cache 360, 370 when responding to a request from the DNS front end 300. Community relay nodes may register and unregister themselves with the promoter 210 to make themselves known, the results of which may be maintained in the PNRP cache 390. The community relay nodes may register under the corresponding PNRP name (e.g., SSL or UDP), and may inform the promoter 210 of its IP address, communication type and quality of service. The PNRP manager 340 may also utilize the PNRP names to conduct PNRP queries of the community relay nodes as part of maintaining the resolution caches 360, 370, as discussed further below.

Figure 4:
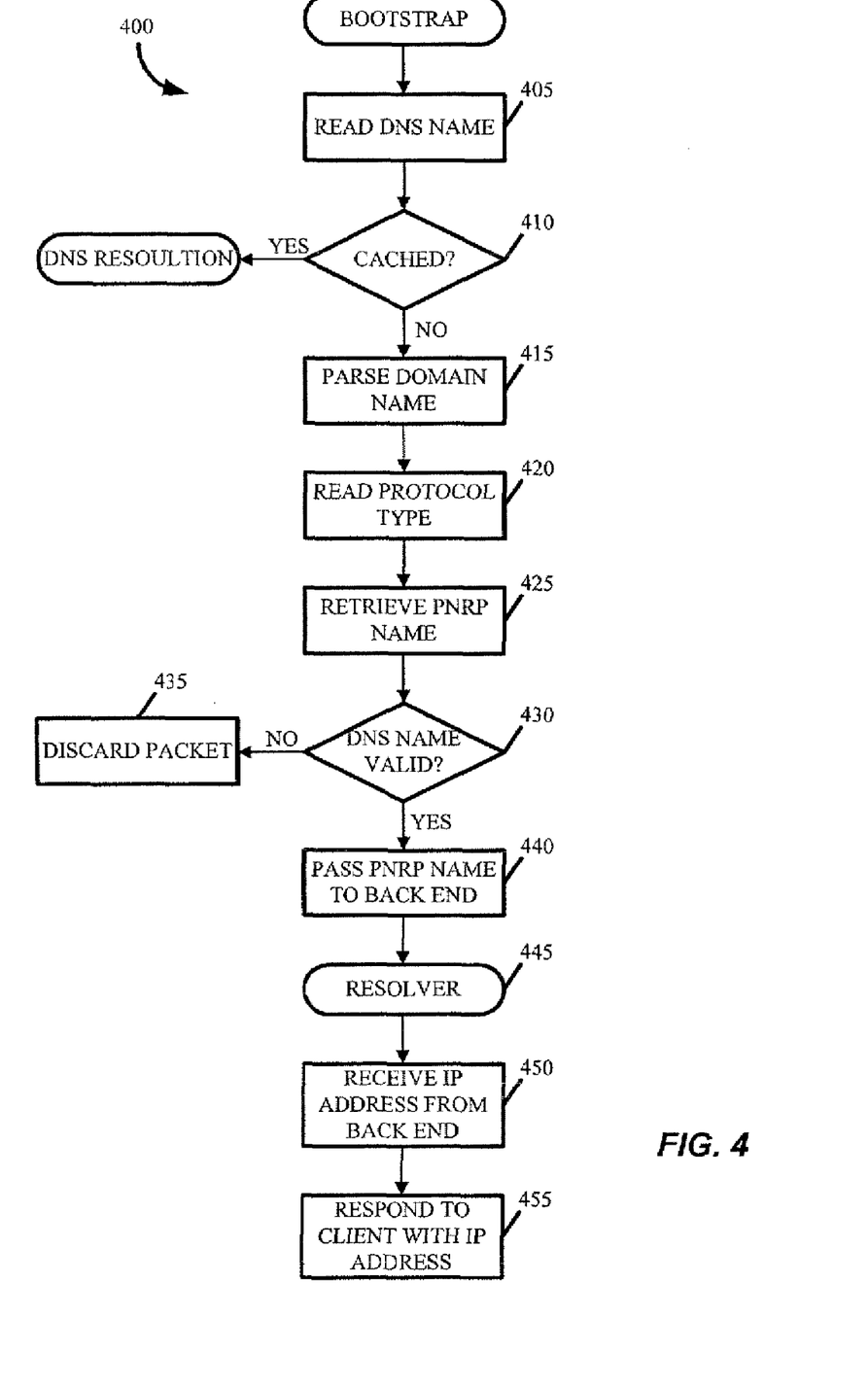
FIG. 4 is a flowchart of a method of bootstrapping communications between a client and a community relay node in accordance with the claims.

FIG. 4 is a flowchart of an example of a method 400 of bootstrapping communication between a client 220 and a community relay node 240. When a client 210 wants to communicate with an access-protected client 220, but does not know of a community relay node 240 to route communications between the clients 220, 230, the promoter 210 may utilize the method 400 to bootstrap the communication between the client 220 and the community relay node 240, and then remove itself from the process. The promoter 210 may receive a request for a community relay node from a client 210 and return an IP address of a community relay node 240 to the client 220. Upon receiving the IP address of the community relay node 240, the client 220 may communicate with the community relay node via HTTP and consequently communicate with the access-protected client 230.

Referring to FIG. 4, the DNS interface 320 of the promoter 210 may receive and read a request message from the requesting client 220 at block 405. The promoter 210 may be associated with a well-known DNS name that is known by the user of the client 220. The client 220 may structure the request message to be recognized by the promoter 210 as relating to a request for a community relay node. As with standard domain name service, the client request may be routed through several different DNS servers before arriving at the promoter 210. The DNS name of the promoter 210 and the requests for a community relay node, may be based on the following format:

xxxxxxxx.tunnel.version.suffix where:

suffix=a configurable parameters to define the promoter 210 (e.g., promoter.microsoft.com);

version=a constant representing the version of the client and used by the promoter 210 understand the rest of the name (e.g., v1);

tunnel=the tunnel type request (e.g., SSL, UDP); and xxxxxxxx=a random alphanumeric prefix to prevent standard domain name service caching.

Examples of DNS names for the promoter 210 may include:

wfnoaycl.udp.v1.promoter.microsoft.com krgdjfto.ssl.v1.promoter.microsoft.com

As indicated above, the promoter 210 may function as a name server for standard domain name service and may maintain a database of cached results. As such, the DNS interface 320 may receive standard DNS requests and return results that are cached in its database. Upon reading the DNS name at block 405, the DNS interface 320 may check its database at block 410 according to standard domain name service to determine whether or not a results has been cached for the DNS name. If so, the DNS interface may return the cached result according to standard DNS resolution. However, because the prefix (wfnoaycl or krgdjfto) is randomly generated, the DNS name is unique and will not be found in the database of the DNS interface 320, thereby bypassing standard DNS service and preventing the domain name service from prematurely returning a result to the requesting client 220. Because the suffix in the domain name read at block 405 (promoter.microsoft.com) indicates the recipient is the promoter 210, the DNS interface 320 may parse the DNS name and pass the result to the DNS plug-in 330. In a similar manner, the structure of the DNS name prevents other DNS servers from prematurely responding to the requesting client 220, but routes the DNS name to the promoter 210. Further, the time-to-live (TTL) of the DNS name may be set to zero to avoid caching of the DNS name.

At block 415, the decoder of the DNS interface 320 may parse the DNS name in a query name and a query type. The query name may relate to the original DNS name (e.g., ssl.v1.promoter.microsoft.com or udp.v1.promoter.microsoft.com) and the query type may relate to the tunnel type (e.g., SSL or UDP). The prefix may generally be ignored. The query name and the query type may subsequently pass to the DNS plug-in 330.

At block 420, the DNS interface 320 may read the requested protocol type. Based on the protocol type, the DNS interface 320 may resolve or otherwise associate the DNS name with the relevant PNRP name at block 425 to retrieve the PNRP name of the relevant list of community relay nodes. The PNRP name of the community relay nodes may be based on the following format:

0.QOS.tunnel.version.suffix where:

suffix=a configurable parameters to define the list of community relay nodes (e.g., promoter.microsoft.com);

version=a constant representing the version of the community relay node and used by the promoter 210 to match between the client version and the community relay node version (e.g., v1);

tunnel=the tunnel type requested (e.g., SSL, UDP); and

QOS=the quality of service of the community relay node (e.g., 0—high; 1—medium; 2—low).

Examples of PNRP names for the lists of community relay nodes may include:

0.udp.v1.promoter.microsoft.com
    0.ssl.v1.promoter.microsoft.com The mapping of the DNS name to the relevant list of community relay nodes may be performed by comparing the PNRP name with the suffix of the DNS name. For example, if the suffix of the DNS name is "udp.v1.promoter.microsoft.com", the DNS interface may associate the DNS name with PNRP name of "0.udp.v1.promoter.microsoft.com" which corresponds to the list of UDP community relay nodes maintained in the UDP cache 370. If the suffix is "ssl.v1.promoter.microsoft.com", the DNS name may be associated with the PNRP name of "0.ssl.v1.promoter.microsoft.com" which corresponds to the list of SSL community relay nodes maintained in the SSL cache 360 of SSL community relay nodes. In one example, the DNS interface 320 may maintain maps of DNS names and PNRP names. If the DNS name is in the map, the DNS interface may retrieve the corresponding PNRP name by comparing the suffix of the DNS name to the PNRP name. Otherwise, the request may be discarded. Alternatively, the PNRP name may be encoded within the DNS name, which may be decoded and passed to the PNRP manager 340. An example of encoding PNRP names in DNS names is described in a U.S. patent application entitled "DNS Compatible PNRP Peer Name Encoding" filed on Apr. 22, 2005 under Ser. No. 11/112,040, the contents of which are expressly incorporated by reference herein.

At block 430, the DNS plug-in 330 may determine whether the DNS name is valid or not based on the query name and the query type. If the query type is not supported (i.e., the query type is not related to UDP or SSL), the DNS plug-in 330 may return an error to the DNS interface 320 causing the request to be discarded at block 435. If the query type is supported, the DNS plug-in 330 may pass the PNRP name to the PNRP manager 340 at bock 440. The PNRP back end 310 may conduct a resolver routine 445 to select a community relay node and return the IP address of the community relay node to the DNS front end 300. A sample computer code implementation that may be called by the DNS plug-in whenever the DNS interface 320 receives a DNS name for which it has no response in its own database may be as follows:

```
DWORD WINAPI DnsPluginQuery(
    PSTR            pszQueryName,
    WORD            wQueryType,
    PSTR            pszRecordOwnerName,
    PDB_RECORD *    ppDnsRecordListHead
)
```

At block 450, the DNS front end 300 may receive the IP address of the selected community relay node from the PNRP back end 310. The selected community relay node and the associated IP address relates to the communication protocol type requested by the client 220. For SSL requests, the PNRP back end 310 may return an IPv4 address of an SSL community relay node. For UDP requests, the PNRP back end 310 may return an IPv6 address of a UDP community relay node. The IPv6 address may include a port number with which to connect to the community relay node. In yet another example, the PNRP back end 310 may return a community relay node IP address for network address translator (NAT) traversal. The IP address for NAT traversal may be an IPv6 address that encapsulates the community relay node's external IPv4 address, UPD port number, NAT type, and the public IPv4 address of an NAT traversal server. The NAT traversal IP address may be utilized for subsequent communication between the community relay node 240 and the requesting client 220 to allow IPv4 clients to communicate over an IPv6 network when behind a network address translator, examples of which are disclosed in U.S. patent application Ser. No. 10/401,083 entitled "Allowing IPv4 Clients to Communicate Over an IPv6 Network When Behind a Network Address Translator With Reduced Server Workload", filed on Mar. 27, 2003, the contents of which are expressly incorporated by reference herein.

The IP address may be transmitted to the requesting client 210 at block 455 in response to the initial request. Subsequently, the client 210 may use the IP address to contact the community relay node 240 via HTTP communication and communicate with the access-protected client 220 via routing procedures facilitated by the community relay node. The requesting client 220 may cache the IP address of the community relay node 240 for future use, thereby reducing the load on the promoter 210. If the client 220 does not receive a response based on its cached IP address, the client 220 may initiate a new request to the promoter 210 for an IP address of another community relay node. In another example, the client 220 may be provided with the PNRP address of one or more community relay nodes, and conduct PNRP queries, thereby further reducing the load on the promoter 210. If the PNRP query does not return any responses, the client 220 may submit a request to the promoter 210.

Figure 5:
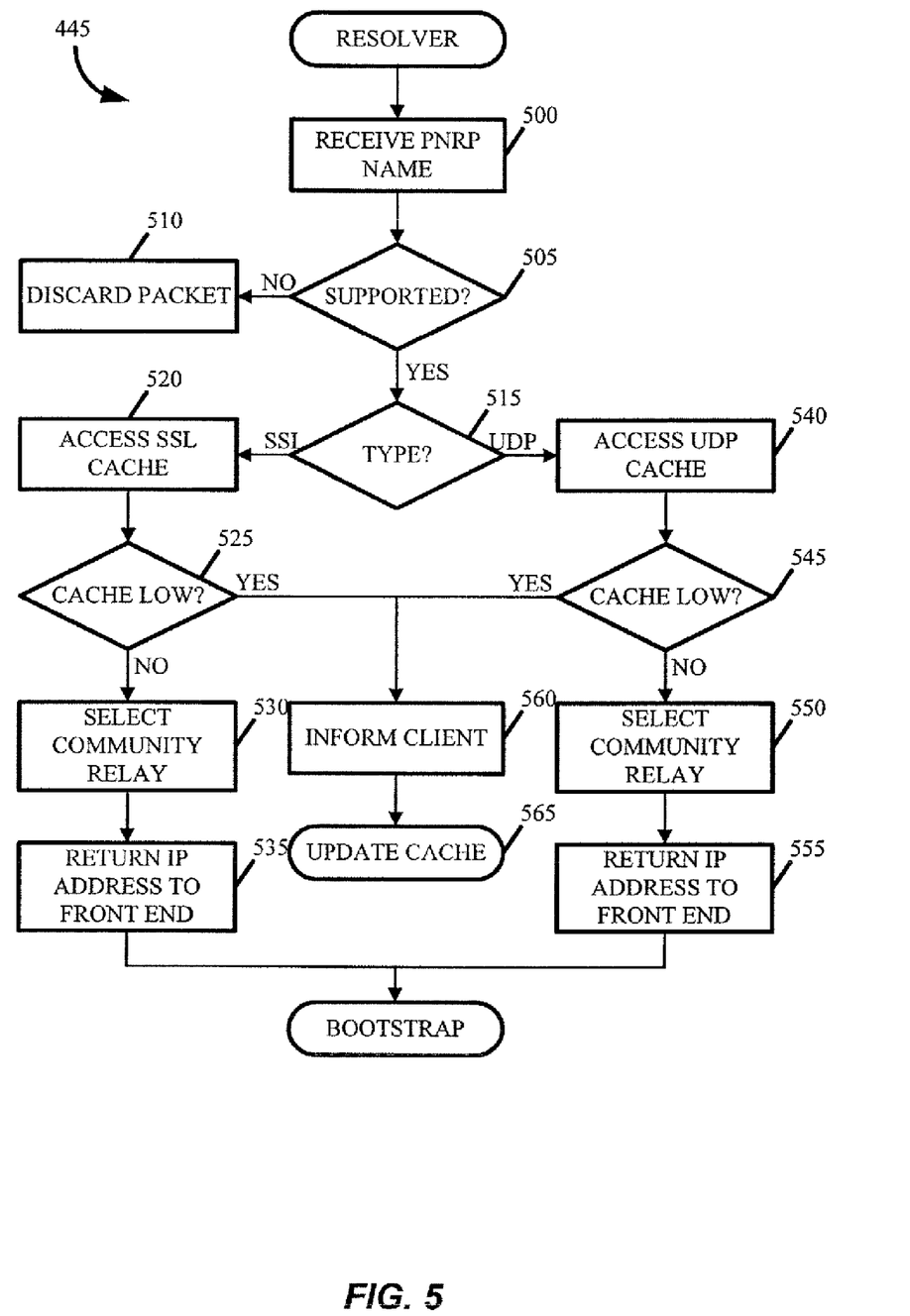
FIG. 5 is a flowchart of a method of resolving a request from a client for a community relay node in accordance with the claims.

FIG. 5 is a flowchart of an example of a method 445 of resolving a PNRP address received from the DNS front end 300 to an IP address of a community relay node. In response to receiving a PNRP name from the DNS front end 300, the PNRP back end 310 may select a community relay node and return the IP address to the DNS front end 300.

Referring to FIG. 5, the PNRP manager 340 may receive the PNRP name from the DNS plug-in 330 at block 500. If needed, the PNRP name may be queued in the request cache 380. The PNRP manager 340 may respond to the request in the order in which the PNRP name was queued. The PNRP manager 340 may establish a predetermined threshold for the number of concurrent requests and the rate of resolution, and monitor the number of queued PNRP names in the request cache 380 and the average amount of time for resolving the requests. PNRP names that exceed a predetermined time-to-live in the request cache 380 may be automatically discarded. Additional requests may be denied until the number of concurrent requests and rate of resolution recede from the threshold.

When ready to respond to the request, the PNRP manager 340 may check that the PNRP name to be resolved is among a list of PNRP names allowed by an administrator of the promoter 210 at block 505. In other words, the PNRP manager 340 may determine whether the list of community relay nodes associated with the PNRP name are maintained by the promoter 210. A PNRP name may not be supported if the corresponding cache is empty or if all community relays are being used to capacity. The PNRP manager 340 may maintain and update the list of supported PNRP names after responding to each request. If the PNRP name is not found in the among the list of supported PNRP names, the PNRP manager 340 may discard the request at block 510 or inform the DNS front end of the error. The PNRP manager 340 may also refuse to support requests if the promoter 210 has reached a threshold number of requests or rate of resolution based on monitoring the request cache 380.

If the PNRP name is supported, at block 515 the PNRP manager 340 may determine the relevant list of community relay nodes from which to select a community relay node. Because the community relay nodes of a particular communication protocol type may be stored as a list under a single PNRP name which may be used to identify the relevant resolution cache 360, 370, the PNRP manager 340 may easily determine the relevant cache or list that contains the IP addresses of community relay nodes that may be provided to the requesting client 210. For example, the if the PNRP name is received from the DNS front end is "0.ssl.v1.promoter.microsoft.com", the PNRP manager 340 may access the list of SSL community relay nodes maintained in the SSL cache 370, whereas if the PNRP name is "0.udp.v1.promoter.microsoft.com", the PNRP manager 340 may access the list of UDP community relay nodes maintained in the UDP cache 360.

If the determination at block 515 results in a PNRP name associated with SSL communication relay nodes, the PNRP manager 340 may access the SSL cache 360 at block 520. Although the promoter 210 may be capable of conducting PNRP queries of community relay nodes as each client request is received, such process may be slow. As such, the promoter 210 may pre-fetch the IP addresses of available community relay nodes and store the results in the cache 360, 370. If the cache 360 is low or empty, the PNRP manager 340 may decline to respond to the request and inform the DNS front end 300, which in turn may inform the client 210, at block 560. The cache may be low or empty based on a lack of available community relay nodes, which may result from maximizing load capacity, community relay nodes going offline, previously committed community relay nodes, etc. The PNRP manager 340 may update the cache at block 565, as discussed further below.

If the SSL cache 360 has available community relay nodes, as determined at block 525, the PNRP manger 340 may select a community relay node at block 530. As mentioned above, the IP address of the community relay node may be stored along with additional details, such as quality of service, load and location. These details may be taken into account by the PNRP manager 340 when selecting a community relay node. For example, the PNRP manager 340 may maintain a stack of available community relay nodes along with lists of used and unused community relay nodes. The available community relay nodes may be determined based on PNRP resolution discussed further below. The newest community relay nodes may be stacked at the top, which in turn may be stacked according to use, quality of service with higher quality of service stacked towards the top. Community relay nodes that are being used but with a low load may be stacked beneath the first group of unused community relay nodes and also arranged according to quality of service. Subsequent community relay nodes may be stacked accordingly.

In selecting a community relay nodes, the PNRP manager 340 may start at the top of the stack and return the newest, unused, high QOS community relay node in the list. If more than one community relay node is selected, the PNRP manager 340 may select the community relay node that is closest to the requesting client 220. However, if no unused community relay nodes are present, the PNRP manager 340 may select a community relay node with the lowest load (i.e., the least used). As such, the PNRP manager 340 may balance the load among the available community relay nodes, even if all community relay nodes are being used. If the load among all community relay nodes are comparable, the PNRP manager 340 may select the community relay node with the highest quality of service. If the PNRP manager 340 searches through the stack without resulting in a community relay node, the PNRP manager 340 may simply select the first community relay node in the stack. On the other hand, if more than one community relay node is selected, the PNRP manager 340 may select the community relay node closest to the requesting client 220. Once the PNRP manager has found a suitable community relay node, the IP address is selected from the SSL cache 360. As a result the PNRP manager may potentially select the newest, unused community relay nodes with the highest available quality of service. If no new, unused community relay nodes are available, the PNRP manager 340 may select the next most suitable community relay node, thereby providing the requesting client 220 with the best available community relay node while balancing the load among available community relay nodes. It should be understood that the order in which the community relay nodes are stacked and considered for selection may be varied from what has been disclosed, and may be ordered according to a variety of criteria, including the criteria disclosed herein.

Upon selecting a SSL community relay node, the PNRP manager 340 may return the IP address to the DNS front end 300 at block 535, which in turn may return the IP address to the requesting client 220, as described with reference to FIG. 4. The IP address of the SSL community relay node may be an IPv4 address (e.g., 200.1.2.3).

A similar process may be performed if the determination at block 515 results in a PNRP name associated with UDP communication relay nodes. At block 540, the PNRP manager 340 may access the UDP cache 370. If the cache 370 is low or empty, the PNRP manager 340 may decline to respond to the request and inform the DNS front end 300, which in turn may inform the client 210, at block 560, and update the cache at block 565. If the UDP cache 370 has available community relay nodes, the PNRP manger 340 may select a community relay node at block 560. The selection process of a UDP community relay node may be the same as the selection process for the SSL community relay node, described above. Upon selecting a UDP community relay node, the PNRP manager 340 may return the IP address to the DNS front end 300 at block 555, which in turn may return the IP address to the requesting client 220, as described with reference to FIG. 4. The IP address of the UDP community relay node may be an IPv6 address with a communication port number of the UDP community relay node (e.g., 200.1.2.4, port 1234).

Figure 6A:
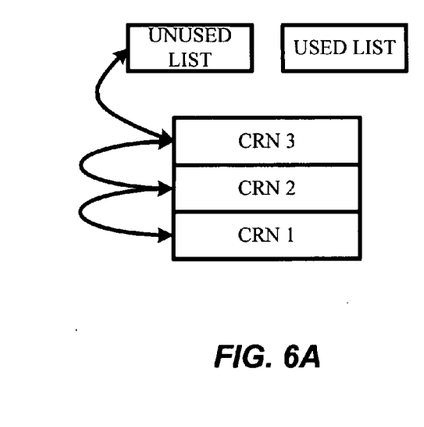
FIGS. 6A-6F are block diagrams illustrating management of community relay nodes in accordance with the claims.
Figure 6B:
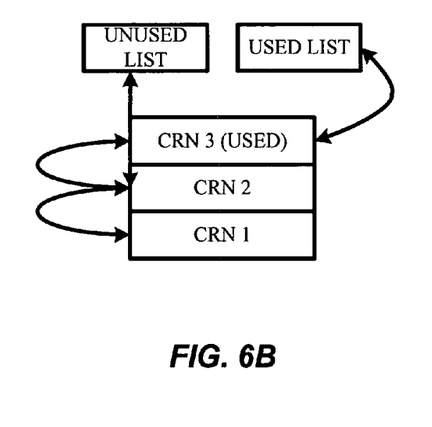
Figure 6C:
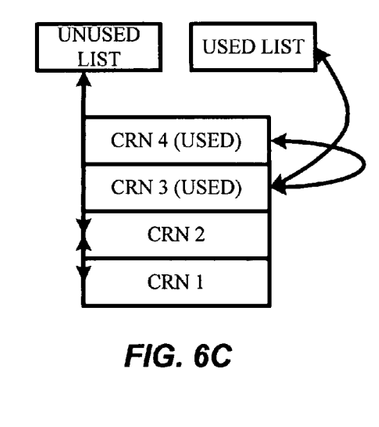
Figure 6D:
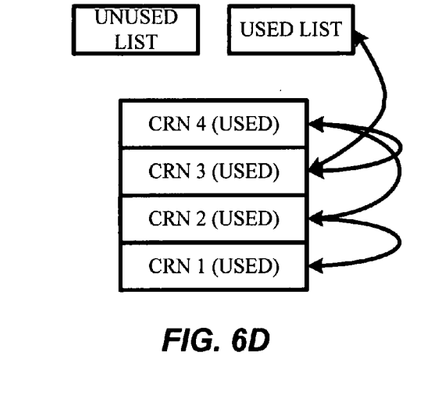
Figure 6E:
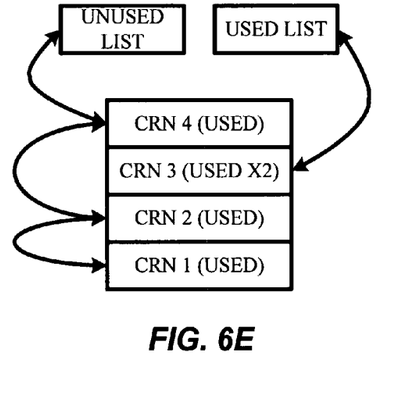
Figure 6F:
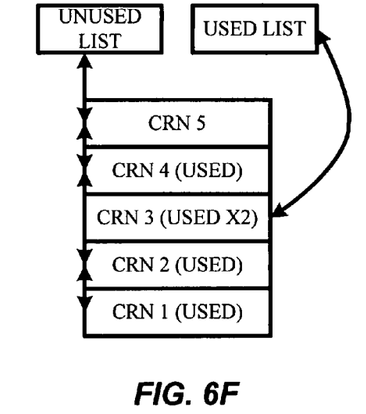

Referring to FIGS. 6A-6F, the PNRP manager 340 may maintain lists of used and unused community relay nodes, along with a PNRP stack of available community relay nodes to assist in the selection of a community relay node. A separate PNRP stack may be maintained for each PNRP name (e.g., a PNRP stack for SSL and another for UDP). In FIG. 6A, the available community relay nodes (CNR 1, CNR 2, CNR 3) remain unused and are included in the list of unused community relay nodes. CNR 3 may be the newest community relay node and is therefore stacked at the top. Subsequently, as shown in FIG. 6B, a community relay node (CRN 3) is used and moved to the used list, with the remaining unused community relay nodes moving up in the order, which may be signified by a stack pointer. In FIG. 6C, a new available community relay node (CNR 4) is added to the stack. Because the new community relay node (CNR 4) is now the newest, a stack pointer may indicate it is the first to be selected and moved to the used list. In FIG. 6D, stack points indicates the remaining two unused community relay nodes (CNR 1 and CNR 2) are to be selected, with the previous community relay nodes (CNR 3 and CNR 4) having already been used. In FIG. 6E, with all available community relay nodes having been used, the PNRP manager 340 may select CNR 3 as having been used least recently, in an effort to maintain load balancing. The remaining community relay nodes may be removed from the used list and maintained in the unused list in the absence of any further new or unused community relay nodes. In FIG. 6F, a new available community relay node (CNR 5) is added to the top of the unused list, with CNR 3 remaining as the most used community relay node in the used list.

As a result, the PNRP manager 340 may manage the available community relay nodes by selecting community relay nodes that are the newest and least used, while balancing the load. The used and unused lists may add new community relay nodes and remove old ones. The PNRP manager 340 returns the newest unused community relay nodes first. If all community relay nodes are used, the PNRP manager 340 returns the community relay nodes in the order in which they were previously used. The PNRP stack remains responsible for pre-fetching PNRP names to continually repopulate the stack with new available community relay nodes. The PNRP stack may further maintain its size to a desired level. If, after the PNRP resolution discussed below, the stack is larger than a predetermined size, older or used community relay nodes may be removed from the stack and the new available community relay nodes from the PNRP resolution are added.

The PNRP manager 340 may further monitor the required resolved requests per second as calculated from the ratio of the predetermined stack size to the number of seconds before the request expires. The number of requests at any one time may be calculated from the sum of the required resolved requests per second and the used resolutions. For any one time (e.g., per second), the PNRP manager 340 may not issue more PNRP requests than the limit specified in the configuration of the stacks and the resolution caches 360, 370.

Figure 7:
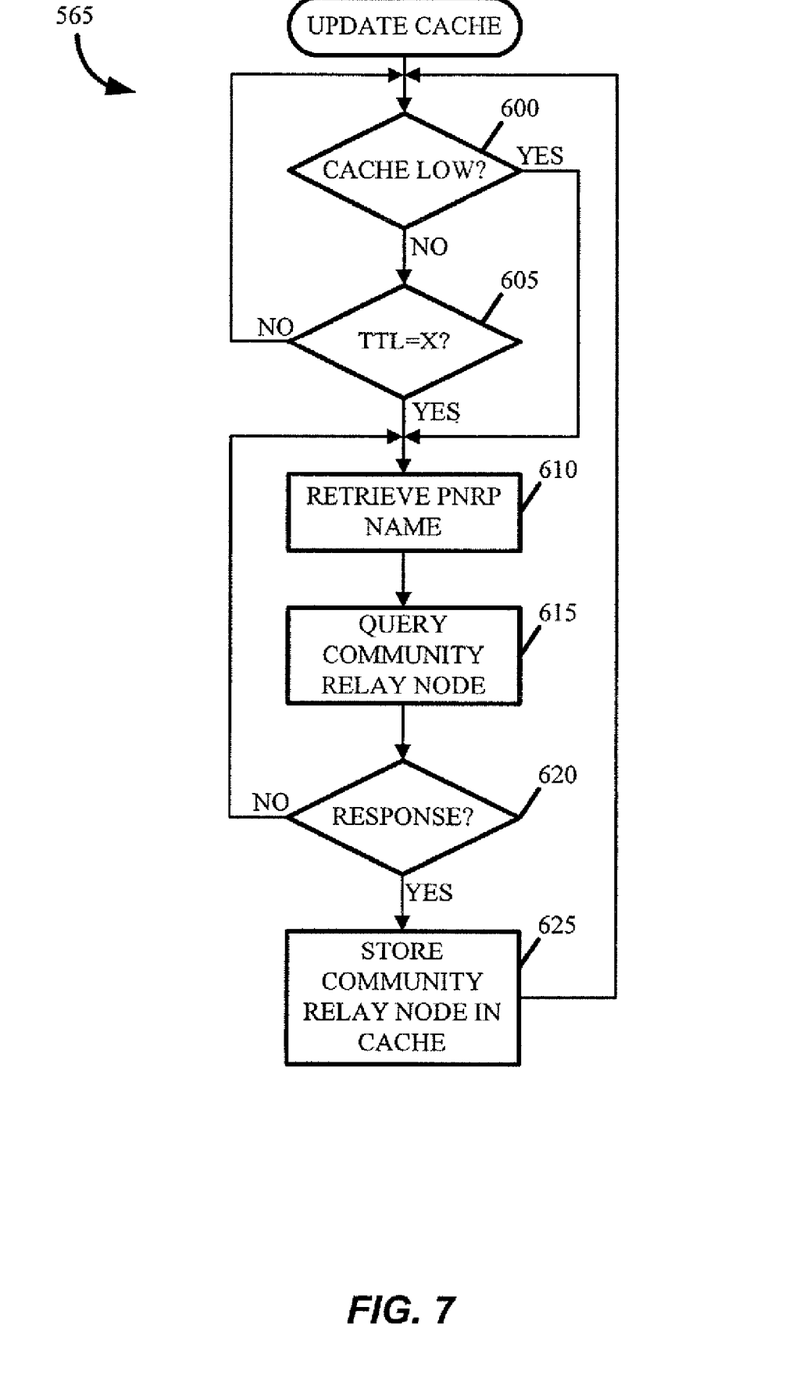
FIG. 7 is a flowchart of a method of updating and maintaining lists of community relay nodes in accordance with the claims.

FIG. 7 is a flowchart of a method 565 of updating and maintaining the resolution caches 360, 370. Although shown as being implemented during the method of FIG. 5, the updating method 565 may be performed continuously in parallel with the other functions of the PNRP manager 340, but may be specifically called upon if requests outpace the available community relay nodes or to replace a previously selected community relay node. In effect, the PNRP manager 340 may pre-fetch the community relay nodes in advance of the requests rather than in response to each request. While the PNRP manager 340 may conduct PNRP queries of community relay nodes for each request, pre-fetching may return results faster. The method 565 may be performed separately for the SSL cache 360 and the UDP cache 370. Generally, the resolution caches 360, 370 are configurable by size and age.

Referring to FIG. 7, the PNRP manager 340 may determine whether the cache is low or empty at block 600. Whether or not the cache is low may be determined based on a predetermined threshold. Of course, if the cache is empty, the cache may be considered low. The cache may be considered low based on a variety of parameters, such as if there are too few unused community relay nodes, if there are too few used community relay nodes with light nodes, if there are too few community relay nodes with a high quality of service, etc. If the cache is considered low, control may pass to block 610. If the cache is not low, control may pass to block 605.

At block 605, the PNRP manager 340 may determine whether any of the community relay nodes listed in the caches 360, 370 are older than a predetermined time-to-live threshold. Because community relays may go offline or become otherwise unavailable, the PNRP managers 340 may remove community relay nodes from the lists after a predetermined amount of time to keep the list fresh. Removed community relay nodes may be stored in the PNRP cache 390. If the time-to-live threshold is reached or exceeded at block 605 control may pass to block 610 to replace older community relay nodes with newer community relay nodes. Otherwise, control may pass back to block 600 to continually repeat the updating method 565.

At block 610, the PNRP manager 340 may retrieve the PNRP name associated with a list of known community relay nodes maintained in the PNRP cache 390. The PNRP name may be the same as that used to identify the list of available community relay nodes (e.g., 0.ssl.v1.promoter.microsoft.com or 0.udp.v1.promoter.microsoft.com). For example, in updating the SSL cache 360, the PNRP manager 340 may use the PNRP name of 0.ssl.v1.promoter.microsoft.com to identify the list of known SSL community relay nodes. In updating the UDP cache 370, the PNRP manger 340 may use the PNRP name of 0.udp.v1.promoter.microsoft.com to identify the list of known UDP community relay nodes. The list of PNRP names maintained by the PNRP cache 390 may be the same as those used for the mappring process discussed above. Although described as maintaining only two PNRP names, the PNRP cache 390 may maintain several PNRP names, based on communication protocol type, version, quality of service, etc., with each PNRP name associated with one or more corresponding community relay nodes.

At block 615, the PNRP manager 340 may conduct a PNRP resolution via the PNRP interface 350 using the PNRP name. The PNRP resolution may include querying multiple community relay nodes that have registered with the promoter 210. As a result, multiple community relay nodes may be queried simultaneously. Further, the PNRP managers 340 may query the community relay nodes randomly to return random IP addresses under the same PNRP name and maintain a balanced load among the community relay nodes. The PNRP manager 340 may use a random hint number to the PNRP APIs. The random number may be supplied when registering community relay nodes and when conducting PNRP resolution, to produce a random results from the PNRP network. Examples of PNRP resolution are disclosed in U.S. Patent Publication No. 2002/0143989 filed Aug. 29, 2001, and U.S. Patent Publication No. 2005/0004916 filed Jun. 13, 2003, the contents of which were expressly incorporated by reference above.

If the PNRP manager 340 receives a response from one or more community relay nodes at block 620, the PNRP manager 340 may add the IP address of the community relay node to the corresponding list in the resolution caches 360, 370. Likewise, the PNRP manager 340 may add the new, unused community relay nodes to the top of the stacks of available community relay nodes. In one example, the PNRP manager 340 may move the newest, unused community relay nodes to the top of the lists and stacks. As a result of this continual pre-fetching and updating of the resolution caches 360, 370, newer community relay nodes may be added to the top of the list. If the PNRP manager 340 does not receive a response to the PNRP query, control may pass back to block 610 and the PNRP manager 340 may use the next PNRP name for a PNRP query.

Based on the foregoing disclosure, a requesting client that is access-protected may use a well-known DNS name of the promoter to discover community relay nodes. The DNS name may be structured to indicate the communication protocol type, and received by a DNS front end of the promoter 210. Based on the format of the DNS name, the DNS front end associates the DNS name with a PNRP name, and passes the PNRP name to a PNRP back end of the promoter 210. The PNRP back end maintains pre-fetched lists of community relay nodes and resolves the PNRP name to select a community relay node and return the IP address of the selected community relay node to the DNS front end. The DNS front end then returns the IP address to the requesting client, which may then contact the community relay node via HTTP and subsequently communicate with another access-protected client with the communication relay node traversing the firewalls. The communication relay node may be selected based on communication protocol type, quality of service, proximity to the requesting client, load, etc. A community relay nodes may register its IP address with the promoter 210 under a predefined PNRP name. The PNRP back end may continually update the lists of available community relay nodes using PNRP resolution.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

Thus, many modifications and variations may be made in the techniques and structures described and illustrated herein without departing from the spirit and scope of the present claims. Accordingly, it should be understood that the methods and apparatus described herein are illustrative only and are not limiting upon the scope of the claims.

What is claimed as new and desired to be protected by Letters Patent of the United States is:

1. A method of discovering a community relay node within a network community, wherein the community relay node is operatively coupled to an access-protected client and adapted to facilitate communication between the access-protected client and a requesting client, the method comprising:
   receiving a request message from a requesting client relating to a request for a community relay node;
   resolving the request message to a first serverless name resolution protocol name associated with a first cache adapted to store a first list of community relay nodes or a second serverless name resolution protocol name associated with a second cache adapted to store a second list of community relay nodes;
   selecting a community relay node from among the first list of community relay nodes if the request message is resolved to the first serverless name resolution protocol name or from among the second list of community relay nodes if the request message is resolved to the second serverless name resolution protocol name, wherein the first list of community relay nodes comprises at least one internet protocol address associated with a first community relay node and the second list of community relay nodes comprises at least one internet protocol address associated with a second community relay node; and
   returning an internet protocol address of the selected community relay node to the requesting client.

2. The method of claim 1,
   wherein the request message comprises a requested communication protocol type;
   wherein resolving the request message comprises resolving the request message to the first serverless name resolution protocol name or to the second serverless name resolution protocol name for the requested communication protocol type;
   wherein selecting a community relay node from comprises selecting a community relay node from among the first or second list of community relay nodes that support the communication protocol type; and
   wherein returning an internet protocol address of a community relay node comprises returning an internet protocol address of a community relay node that supports the requested communication protocol type.

3. The method of claim 2, wherein the communication protocol type relates to one of the group consisting of: a secure sockets layer protocol and a user datagram protocol.

4. The method of claim 1, further comprising: mapping a domain name system name to, the serverless name resolution protocol name;
   wherein the request message comprises the domain name system name; and
   wherein resolving the request message comprises matching the domain name system name to the first or second serverless name resolution protocol name.

5. The method of claim 1, wherein the request type comprises a domain name service name and a serverless name resolution protocol name encoded in the domain name service name, the method further comprising:
   decoding the serverless name resolution protocol name from the domain name system address name; and
   resolving the serverless name resolution protocol name to an internet protocol address of a community relay node.

6. The method of claim 1, wherein selecting a community relay node comprises selecting a community relay node from among the first or second list of community relay nodes based on one of more of the group consisting of: load balancing, quality of service and proximity of the community relay node to the requesting client.

7. The method of claim 1, further comprising
   receiving a registration message from a community relay node, wherein the registration message comprises a serverless name resolution protocol name and an internet protocol address of the community relay node;
   conducting a serverless name resolution protocol query of the registered community relay node;
   receiving a query response from the community relay node;
   storing the peer name resolution protocol address and the internet protocol address of the registered community relay node in the list of community relay nodes.

8. A computer readable medium having computer executable instructions stored on a computer storage medium for performing steps of a method of bootstrapping communication between a community relay node and a requesting client comprising:
   computer executable instructions for receiving a domain name from a requesting client;
   computer executable instructions for associating the domain name with a peer name;
   computer executable instructions for resolving the peer name to a first internet protocol address associated with a first cache a to store a first list of community relay nodes or a second internet protocol address associated with a second cache adapted to store a second list of community relay nodes, where each internet protocol address relates to a community relay;
   computer executable instructions for selecting a community relay node from among the first list of community relay nodes if the request message is resolved to the first internet protocol address or from among the second list of community relay nodes if the request message is resolved to the second internet protocol address; and computer executable instructions for returning the internet protocol address of the selected community relay node to the requesting client.

9. The computer readable medium of claim 8, wherein the domain name comprises a query name and a query type, the computer readable medium further comprising:

computer executable instructions for parsing the domain name into the query name and the query type;

computer executable instructions for associating the query name with a peer name according to the query type; and computer executable instructions for selecting a community relay node according to the query type.

10. The computer readable medium of claim 9, wherein the query type comprises one of the group consisting of: a secure sockets layer protocol and a user datagram protocol.

11. The computer readable medium of claim 8, wherein the computer executable instructions for associating the domain name with a peer name comprise computer executable instructions for matching the domain name with to the peer name based on a predetermined map of domain names and peer names.

12. The computer readable medium of claim 8, wherein the computer executable instructions for associating the domain name with a peer name comprise wherein the computer executable instructions for decoding the peer name from the domain name.

13. The computer readable medium of claim 8, wherein the computer executable instructions for selecting a community relay node comprise computer executable instructions for selecting a community relay node based on one or more of the group consisting of: load balancing, quality of service and proximity of the community relay node to the requesting client.

14. A computing apparatus, comprising:

a processing apparatus comprising a processor and a memory operatively coupled to the processor, a domain name system network interface operatively coupled to a network and to the processing apparatus;

a peer name resolution protocol network interface operatively coupled to at least one community relay, to the domain name system network interface and to the processing apparatus;

a first cache associated with a first peer name resolution protocol name and adapted to store internet protocol addresses of a first plurality of community relay nodes, the first cache being operatively coupled to the peer name resolution protocol network interface;

a second cache associated with a second peer name resolution protocol name and adapted to store internet protocol addresses of a second plurality of community relay nodes, the second cache being operatively coupled to the peer name resolution protocol network interface;

the processing apparatus being programmed to receive a request message from a client relating to a request for a community relay node;

the processing apparatus being programmed to resolve the request message to the first peer name resolution protocol name or to the second peer name resolution protocol name;

the processing apparatus being programmed to select a community relay node from the first cache if the request message is resolved to the first peer name resolution protocol name;

the processing apparatus being programmed to select a community relay node from the second cache if the request message is resolved to the second peer name resolution protocol name; and the processing apparatus being programmed to transmit the internet protocol address of the selected community relay node to the client.

15. The computing apparatus of claim 14, wherein the first peer name resolution protocol name relates to a first communication protocol type and wherein the second peer name resolution protocol type relates to a second communication protocol type.

16. The computing apparatus of claim 15, wherein the first communication protocol type comprises secure sockets layer protocol and the second communication protocol type comprises user data protocol.

17. The computing apparatus of claim 14, wherein the requesting message comprises a domain name system name of the computing apparatus;

wherein the processing apparatus is programmed to resolve the domain name system name to one of the first peer name resolution protocol name or the second peer name resolution protocol name.

18. The computing apparatus of claim 14, wherein the processing apparatus is programmed to select a community relay node from the first cache or the second cache based on one or more of the group consisting of: load balancing, quality of service and proximity of the community relay node to the client.

19. The computing apparatus of claim 14, wherein the programming apparatus is programmed to query a plurality of community relay nodes;

wherein the programming apparatus is programmed to receive data relating to a response from one or more of the plurality of community relay nodes; and wherein the programming apparatus is programmed to update the first cache or the second cache with the one or more responding community relay nodes.

20. The computing apparatus of claim 19, wherein the programming apparatus is programmed to conduct a peer name resolution of the plurality of community relay nodes.

* * * * *

UNITED STATES PATENT AND TRADEMARK OFFICE
CERTIFICATE OF CORRECTION

PATENT NO. : 7,788,378 B2  
APPLICATION NO. : 10/907985  
DATED : August 31, 2010  
INVENTOR(S) : Ravi T. Rao et al.

Page 1 of 1

It is certified that error appears in the above-identified patent and that said Letters Patent is hereby corrected as shown below:

In column 18, line 16, in Claim 4, delete "to," and insert -- to --, therefor.

In column 18, line 60, in Claim 8, delete "a to" and insert -- adapted to --, therefor.

Signed and Sealed this
First Day of February, 2011

David J. Kappos
*Director of the United States Patent and Trademark Office*